US 6,594,605 B2

(12) United States Patent
Kurosawa

(10) Patent No.: US 6,594,605 B2
(45) Date of Patent: Jul. 15, 2003

(54) CORRELATION FUNCTION MEASURING METHOD AND APPARATUS

(75) Inventor: Makoto Kurosawa, Tokyo (JP)

(73) Assignees: Advantest Corp., Tokyo (JP); Minister of Public Management Home Affairs, Posts and Telecommunications, Tokyo (JP)

( * ) Notice: Subject to any disclaimer, the term of this patent is extended or adjusted under 35 U.S.C. 154(b) by 31 days.

(21) Appl. No.: 09/771,527

(22) Filed: Jan. 29, 2001

(65) Prior Publication Data

US 2001/0020220 A1 Sep. 6, 2001

(30) Foreign Application Priority Data

Feb. 3, 2000 (JP) ........................ 2000-026863
Apr. 27, 2000 (JP) ........................ 2000-127080
Sep. 28, 2000 (JP) ........................ 2000-296812

(51) Int. Cl.[7] ................... G01R 23/16; G03H 5/00
(52) U.S. Cl. .................. 702/106; 702/74; 356/450; 375/142
(58) Field of Search ................ 702/74, 75, 76, 702/106, 69–71; 375/142, 150, 343; 382/278; 356/450, 457; 455/276.1, 295

(56) References Cited

U.S. PATENT DOCUMENTS 4,169,245 A  *  9/1979  Crom et al. ............... 455/132
4,607,215 A  *  8/1986  Takano et al. ........... 324/76.23
4,947,176 A  *  8/1990  Inatsune et al. ............ 342/173
5,146,471 A  *  9/1992  Cowart ...................... 375/142
5,748,314 A  *  5/1998  Kitayoshi .................. 356/450
6,272,189 B1 *  8/2001  Garin et al. ............... 375/343
6,295,442 B1 *  9/2001  Camp, Jr. et al. ......... 455/102
2001/0002203 A1 * 5/2001  Cahn et al. ................ 375/142

FOREIGN PATENT DOCUMENTS

DE     196 45 953 A1    5/1997
JP      9-134113 A       5/1997

* cited by examiner

Primary Examiner—Marc S. Hoff
Assistant Examiner—Jeffrey West
(74) Attorney, Agent, or Firm—Muramatsu & Associates

(57) ABSTRACT

A correlation function measuring method and apparatus can correct a correlation vector with high accuracy. The correlation function measuring apparatus includes first signal processing means 18a to 22a for processing a first monitored signal to give a first spectrum, second signal processing means 18b to 22b for processing a second monitored signal to give a second spectrum, correction value computing means 26 for inputting correction signals to the first and second signal processing means to give correction values corresponding to respective frequencies, based on the first spectrum and the second spectrum, and correlation function computing means 30 for obtaining a correlation function between the first spectrum and the second spectrum by using correction values given by the correction value computing means.

10 Claims, 8 Drawing Sheets

CORRELATION FUNCTION MEASURING METHOD AND APPARATUS

BACKGROUND OF THE INVENTION

The present invention relates to a correlation function measuring method and apparatus, more specifically to a correlation function measuring method and apparatus for measuring a correlation vector of a plurality of input signals.

Recently, a technique for visualizing a wave source image by electric wave holography has been practiced and is used, e.g., in monitoring electric waves from base stations for portable telephones. Electric wave holograms of electric waves from base stations of a portable telephone network are analyzed to thereby visually monitor the electric waves from the base stations so as to obtain materials useful to judge whether or not to install a new base station.

A wave source image visualizing method and apparatus has been proposed by the applicant of the present application in, e.g., the specification of Japanese Patent Application No. 289848/1995.

The wave source image visualizing method and apparatus proposed by the applicant of the present application will be explained with reference to FIG. 8. FIG. 8 is a block diagram of the proposed wave source image visualizing apparatus.

As shown in FIG. 8, a monitored signal (a) received by a stationary antenna (not shown) is subjected to prescribed signal processing by the pre-conversion unit 218a, a data memory 220a and Fourier-transform unit 222a to be inputted to a correlation vector computing unit 230 while a monitored signal (b) received by a scanning antenna (not shown) is subjected to prescribed signal processing by a pre-conversion unit 218b, a data memory 220b and a Fourier-transform unit 222b to be inputted to the correlation vector computing unit 230. The pre-conversion units 218a, 218b restrict the monitored signal (a) and the monitored signal (b), based on a center frequency $f_0$ and a band width bw to convert them to IF signals and output the IF signals. The data memories 220a, 220b perform an analog-to-digital (A/D) conversion process on the IF signals and store the A/D converted signals therein. The Fourier-transform units 222a, 222b perform Fourier-transformation to output a spectrum $S_A(f)$ and a spectrum $S_B(f)$.

In the correlation vector computing unit 230, based on the following formula, $$\int_{f_0-\frac{bw}{2}}^{f_0+\frac{bw}{2}} \frac{S_A^*(f) \cdot S_B(f)}{|S_A(f)|} df \quad (1)$$

a correlation vector is given, where * represents a complex conjugate.

In such a wave source image visualizing apparatus, when measuring conditions, such as band width restriction, frequency conversion, etc., are changed, frequency characteristics of the pre-conversion units 218a, 218b change. Furthermore, the frequency characteristic change varies between the pre-conversion unit 218a and the pre-conversion unit 218b.

Accordingly, it is necessary to prepare in advance correction data, and a correlation vector is corrected by using the correction data. The wave source image visualizing apparatus shown in FIG. 8 gives correction data ρ(c) in the following way.

That is, when correction data ρ(c) is given, switches 216a, 216b, 224 are set on a correction side (c), correction signals are outputted by a signal generator 212, the correction signals are distributed to two paths by the power splitter 214, the correction signals are inputted to the correction sides (c) of the switches 216a, 216b, and a correlation vector is given by the correlation vector computing unit 230. A value of the given correlation vector is stored in a correction data memory 228 as the correction data ρ(c).

For electric wave monitor, the switches 216a, 216b, 224 are set on a measuring side (m), and a correlation vector is given by the correlation vector computing unit 230. The given correlation vector is corrected in a correction unit 229 by using the correction data ρ(c) to be outputted to a wave source image reproduction processing unit (not shown).

The wave source image reproduction processing unit performs prescribed image processing, and a processed image is presented on a display of a display unit (not shown).

However, in the proposed wave source image visualizing apparatus, a correlation vector of an average of band frequencies given when a correction signal is inputted is used as correction data ρ(c). Accordingly, in a case that characteristics of the pre-conversion units 218a, 218b change by frequencies, correction accuracy varies depending on frequencies.

Characteristics of the pre-conversion units 218a, 218b are varied by changes of measuring conditions, surrounding temperature changes, changes over time, etc. The proposed wave source image visualizing apparatus has correction accuracy lowered by these factors.

SUMMARY OF THE INVENTION

An object of the present invention is to provide a correlation function measuring method and apparatus which can correct a correlation vector with high accuracy.

The above-described object is achieved by a correlation function measuring method in which a first monitored signal is processed by a first signal processing means to give a first spectrum, a second monitored signal is processed by a second signal processing means to give a second spectrum, and a correlation function between the first spectrum and the second spectrum is measured, the method comprising the steps of: inputting, before measuring the correlation function, correction signals to the first signal processing means and the second signal processing means, and giving correction values corresponding to frequencies of the correction signals, based on a spectrum given by the first signal processing means, and a spectrum given by the second signal processing means; and in measuring the correlation function, giving a correlation function between the first spectrum and the second spectrum by using the correction values corresponding to the frequencies. Correction data for respective frequencies are given before a correlation function is measured, and the correlation function is given by using the correction data corresponding to the frequencies, whereby the correlation function can be given with high accuracy. Thus, the correlation function measuring method can measure a correlation function with high accuracy.

In the above-described correlation function measuring method it is preferable that in giving the correction values, the frequencies of the correction signals are scanned to give the correction values corresponding to the respective frequencies.

In the above-described correlation function measuring method it is preferable that a recurrence formula is given based on the correction values; and in renewing the correction values, correction values necessary to determine at least the recurrence formula are again given to renew the recurrence formula, and based on the renewed recurrence formula, the correction values are renewed.

In the above-described correlation function measuring method it is preferable that in giving the correction values, modulated waves are inputted to the first signal processing means and the second signal processing means to give correction values corresponding to respective frequencies.

In the above-described correlation function measuring method it is preferable that in giving the correction values, first correction signals are inputted to the first signal processing means and the second signal processing means, scanning frequencies, to give magnitude correction data corresponding to the frequencies, based on a spectrum given by the first signal processing means and a spectrum given by the second signal processing means, and second correction signals are inputted to the first signal processing means and the second signal processing means to give phase correction data corresponding to the respective frequencies, based on a spectrum given by the first signal processing means and a spectrum given by the second signal processing means, and the correction values corresponding to the respective frequencies are given based on the magnitude correction data and the phase correction data. Magnitude correction data, which are not frequently necessary, are produced by using first correction signals, while phase correction data, which are frequently necessary, are produced by using second correction signals, and correction values corresponding to the respective frequencies are given by using the correction data, whereby the correction can be quickly made without lowering correction accuracy.

In the above-described correlation function measuring method it is preferable that the second correction signals are modulated waves.

In the above-described correlation function measuring method it is preferable that in giving the magnitude correction data, the frequencies of the first correction signals are scanned at a prescribed step and interpolated to give the magnitude correction data.

In the above-described correlation function measuring method it is preferable that the phase correction data are renewed more frequently than the magnitude correction data.

In the above-described correlation function measuring method it is preferable that when the renewed phase correction data are changed by an amount above a prescribed value with respect to the phase correction data at the time of obtaining the magnitude correction data, the magnitude correction data is renewed.

The above-described object is achieved by a correlation function measuring apparatus comprising: first signal processing means for processing a first monitored signal to give a first spectrum; second signal processing means for processing a second monitored signal to give a second spectrum; correction value computing means for inputting correction signals to the first signal processing means and the second signal processing means to give correction values corresponding to frequencies, based on the spectrum given by the first signal processing means and the spectrum given by the second signal processing means; correlation function computing means for giving a correlation function between the first spectrum and the second spectrum by using the correction values given by the correction value computing means. Correction data for respective frequencies are given before a correlation function is measured, and the correlation function is given by using the correction data corresponding to the frequencies, whereby the correlation function can be given with high accuracy. Thus, the correlation function measuring apparatus can measure a correlation function with high accuracy.

In the above-described correlation function measuring apparatus it is preferable that the correction value computing means gives the correction values corresponding to the frequencies by scanning the frequencies of the correction signals.

In the above-described correlation function measuring apparatus it is preferable that the correction value computing means gives a recurrence formula, based on the correction values, again giving correction values necessary to determine at least the recurrence formula to renew the recurrence formula, and renewing the correction values, based on the renewed recurrence formula.

In the above-described correlation function measuring apparatus it is preferable that the correction value computing means gives the correction values corresponding to the respective frequencies by inputting modulated waves to the first signal processing means and the second signal processing means.

In the above-described correlation function measuring apparatus it is preferable that the correction value computing means inputs first correction signals to the first signal processing means and the second signal processing means, scanning frequencies, gives magnitude correction data corresponding to the respective frequencies, based on the spectrum given by the first signal processing means and the spectrum given by the second signal processing means, inputting second correction signals to the first signal processing means and the second signal processing means to give phase correction data corresponding to the frequencies, based on the spectrum given by the first signal processing means and the spectrum given by the second signal processing means, and gives the correction values corresponding to the respective frequencies, based on the magnitude correction data and the phase correction data. Magnitude correction data, which are not frequently necessary, are produced by using first correction signals, phase correction data, which are frequently necessary, are produced by using second correction signals, and correction values corresponding to the respective frequencies are given by using the correction data, whereby the correction can be quickly made without lowering correction accuracy.

In the above-described correlation function measuring apparatus it is preferable that the second correction signals are modulated waves.

In the above-described correlation function measuring apparatus it is preferable that the correction value computing means scans the frequencies of the first correction signal at a prescribed step and interpolates to give the magnitude correction data.

In the above-described correlation function measuring apparatus it is preferable that the correction value computing means renews the phase correction data more frequently than the magnitude correction data.

In the above-described correlation function measuring apparatus it is preferable that the correction value computing means renews the magnitude correction data when the renewed phase correction data has changed by an amount above a prescribed value with respect to the phase correction data given at the time for obtaining the magnitude correction data.

DETAILED DESCRIPTION OF THE INVENTION

[First Embodiment]

Figure 1:
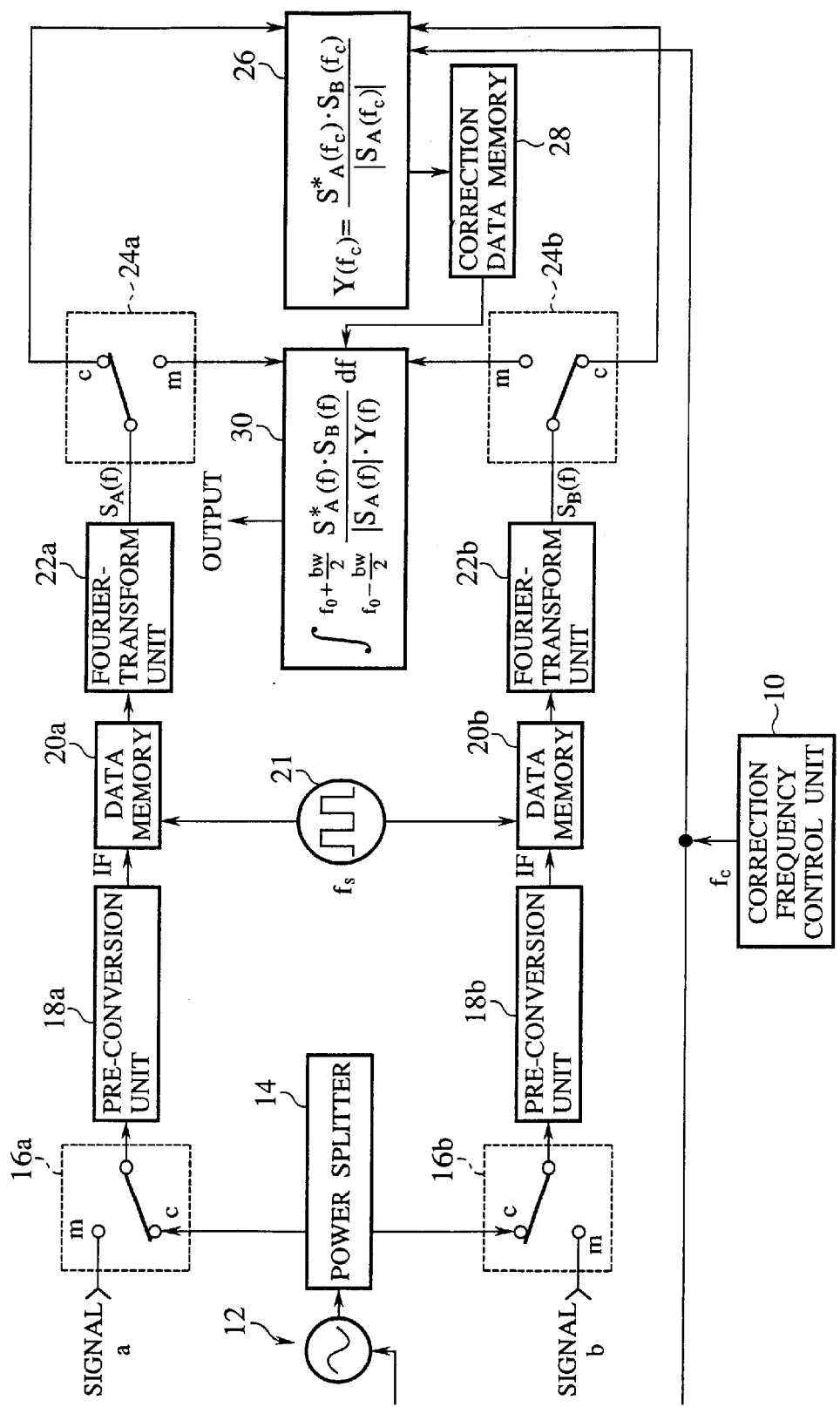
FIG. 1 is a block diagram of the correlation function measuring apparatus according to a first embodiment of the present invention.

The correlation function measuring method and apparatus according to a first embodiment of the present invention will be explained with reference to FIG. 1. FIG. 1 is a block diagram of the correlation function measuring apparatus according to the present embodiment.

The present embodiment will be explained by means of a case that in monitoring electric waves, a correlation function is measured between monitored signals inputted by a stationary antenna and a scan antenna. However, the principle of the present invention is applicable not only to the electric wave monitor, but also to measurement of a correlation function between a plurality of monitored signals.

(Correlation Function Measuring Apparatus)

As shown in FIG. 1, the correlation function measuring apparatus according to the present embodiment comprises a correction frequency control unit 10 for controlling a frequency of a correction signal; a signal generator 12 which generates correction signals at a constant magnitude; a power splitter 14 which distributes the correction signals, switches 16a, 16b which switch the circuits for the correction and for the measurement; pre-conversion units 8a, 18b which band-restrict and convert only a prescribed frequency component to intermediate frequencies IF and output the intermediate frequencies IF; data memories 20a, 20b which sample and store the IF signals outputted by the pre-conversion units 18a, 18b; Fourier-transform units 22a, 22b which Fourier-transform the data stored by the data memories 20a, 20b to give spectra $S_A(f)$, $S_B(f)$; switches 24a, 24b which switch the circuits for the correction and the measurement; correction data computing unit 26 which gives correction data $Y(f_C)$ based on spectra corresponding to the respective correction frequencies; a correction data memory 28 which stores correction data for the respective correction frequencies; and a correlation vector computing unit 30 which gives a correlation vector of monitored signals with reference to the correction data.

The switch 16a has the correction side (c) connected to the power splitter 14 and the measurement side (m) connected to the stationary antenna. The switch 16b has the correction side (c) connected to the power splitter 14 and the measurement side (m) connected to the scan antenna. The switches 24a, 24b have the correction sides (c) connected to the correction data computing unit 26 and the measurement sides (m) connected to the correlation vector computing unit 30. When the switches 16a, 16b and the switches 24a, 24b are set on the correction sides (c), the circuit for obtaining correction data is formed, and the circuit for measuring a correlation function is formed when the switches 16a, 16b and the witches 24a, 24b are set on the measurement sides (m).

The correlation function measuring apparatus according to the present embodiment is characterized mainly in that before a correlation function is measured, correction data are obtained for respective frequencies, and in measuring the correlation function, a correlation vector is given, referring to the correction data for the respective frequencies.

Figure 8:
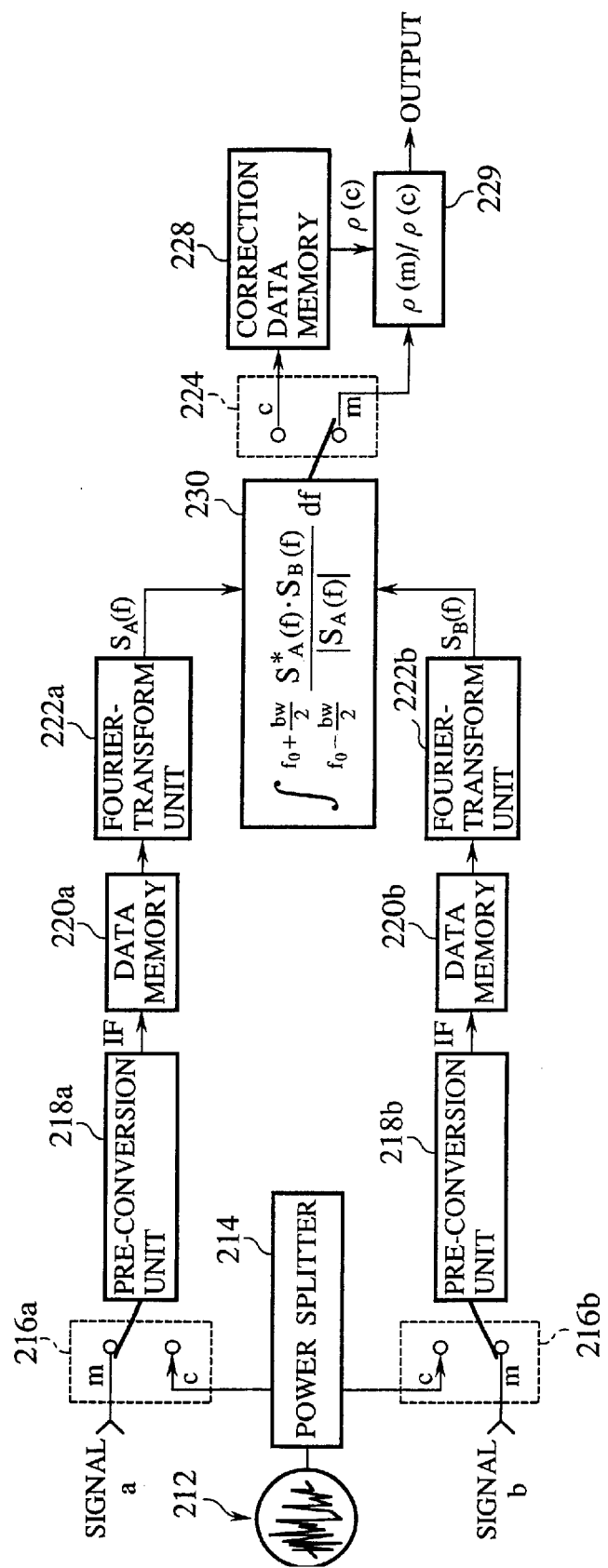
FIG. 8 is a block diagram of the proposed wave source image visualizing apparatus.
Figure 1:
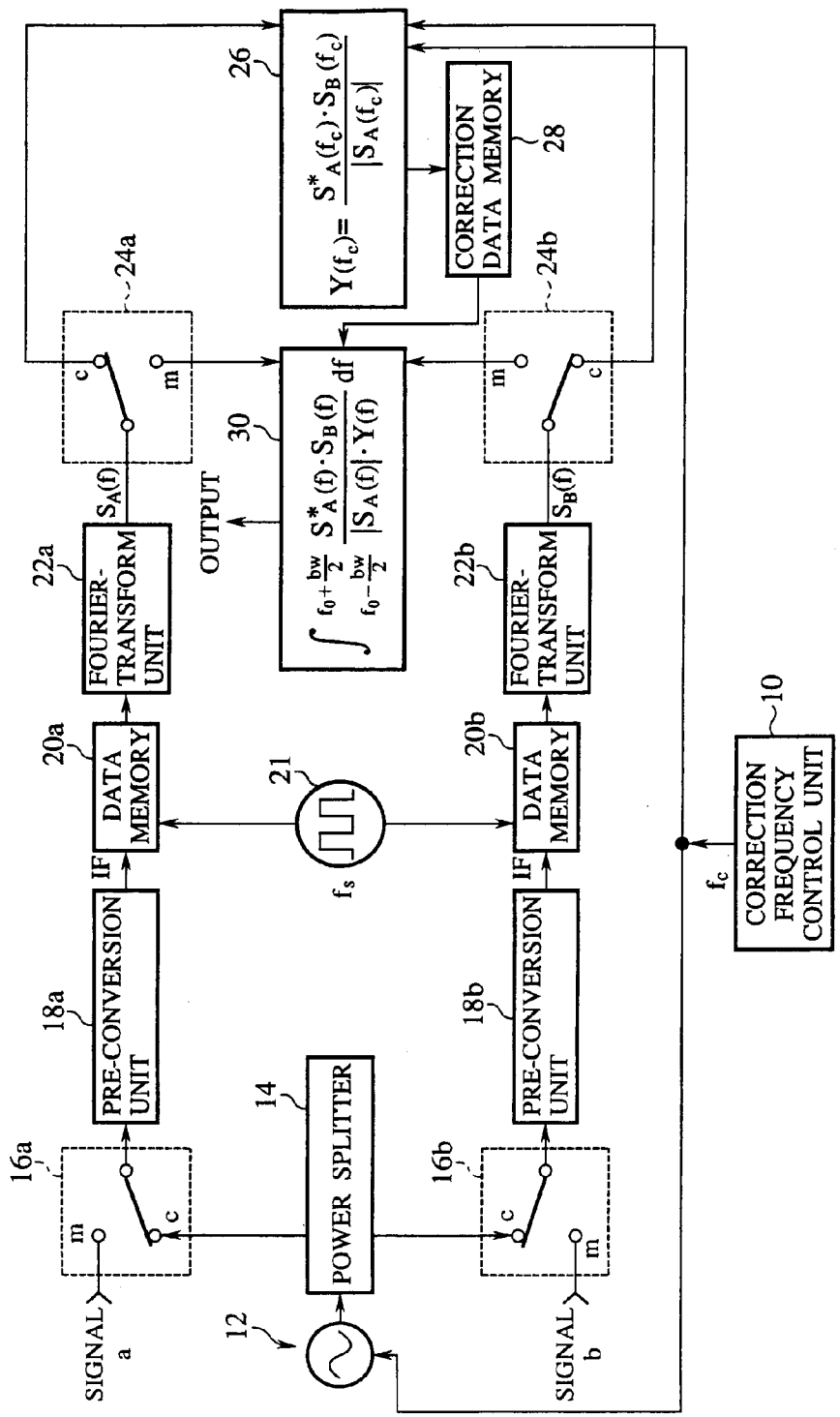
Figure 5:
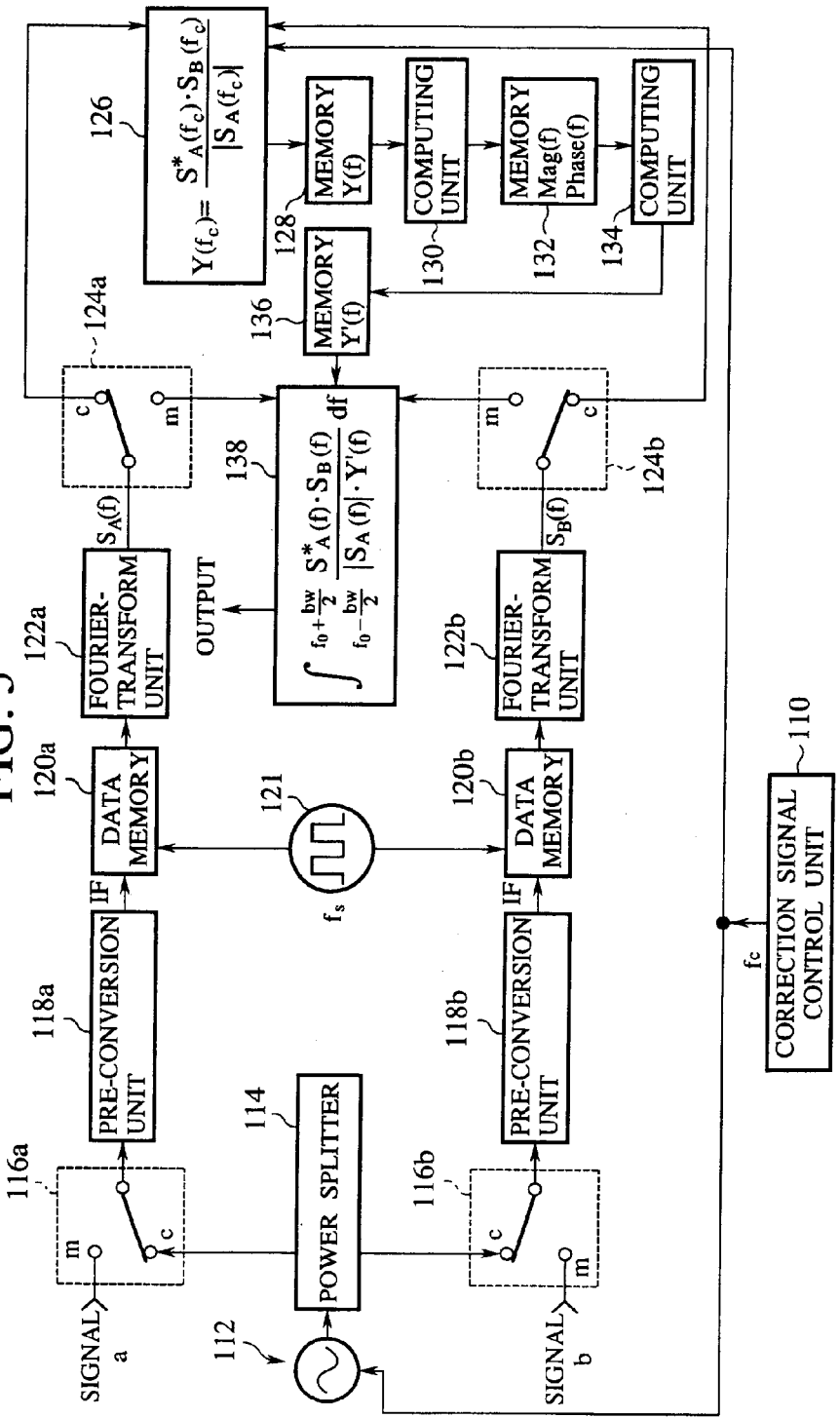

In the proposed wave source image visualizing apparatus shown in FIG. 8, one correction data $\rho(c)$ for an average as frequencies in a certain frequency band is given, and the correction is made, using the correction data $\rho(c)$ Accordingly, when a disuniform spectral distribution is present in the certain frequency band, an accurate correlation vector cannot be given.

However, in the present embodiment, before a correlation function is measured, correction data are given for respective frequencies, and a correlation vector is given, referring to the correction data for the respective frequencies, whereby the correlation vector can be given with high accuracy.

Thus, the correlation function measuring apparatus according to the present embodiment can measure a correlation function with high accuracy.

The respective constituent members of the correlation function measuring apparatus according to the present embodiment will be detailed below.

(a) Correction Frequency Control Unit 10

The correction frequency control unit 10 scans frequencies of correction signals to be outputted by the signal generator 12 at a prescribed step.

Specifically, correction frequencies $f_C$ are scanned in an $f_0 \pm bw/2$ band at an $f_S/M$ step. Here, $f_0$ is a center frequency, bw is a band width, $f_S$ is a sampling frequency supplied by an oscillator 21 to the data memories 20a, 20b, and M is an arbitrary integer.

The correction frequencies $f_C$ are inputted not only to the signal generator 12 but also to the correction data computing unit 26.

(b) Signal Generator 12

The signal generator 12 generates correction signals corresponding to correction frequencies $f_C$ supplied by the correction frequency control unit 10.

The signal generator 12 generates correction signals of a constant magnitude independent of frequencies.

(c) Power Splitter 14

The power splitter 14 distributes correction signals outputted by the signal generator 12 to two paths.

The power splitter 14 has the outputs connected to the correction sides (c) of the switches 16a, 16b.

(d) Switches 16a, 16b

The switches 16a, 16b switch input signals for the correction and the measurement. The switches 16a, 16b are provided by high-frequency switches because the signals to be inputted to the switches 16a, 16b are of high frequencies.

The correction side (c) of the switch 16a is connected to the power splitter 14, and the measurement side (m) of the switch 16a is connected to, e.g., the stationary antenna (not shown).

When the switch 16a is set on the correction side (c), a correction signal from the signal generator 12 is inputted to the pre-conversion unit 18a through the switch 16a, and when the switch 16a is set on the measurement side (m), a monitored signal (a) from the stationary antenna is inputted to the pre-conversion unit 18a through the switch 16a.

The correction side (c) of the switch 16b is connected to the power splitter 14, and the measurement side (m) of the switch 16b is connected to, e.g., the scan antenna (not shown). When the switch 16b is set on the correction side (c), a correction signal from the signal generator 12 is inputted to the pre-conversion unit 18b through the switch 16b, and when the switch 16b is set on the measurement side (m), a monitored signal (b) from the scan antenna is inputted to the pre-conversion unit 18b through the switch 16b.

That is, when the switches 16a, 16b are set on the correction sides (c), the circuit for obtaining correction data is formed, the circuit for measuring a correlation function is formed when the switches 16a, 16b are set on the measurement sides (m).

(e) Pre-conversion Units 18a, 18b

The output sides of the switches 16a, 16b are connected respectively to the pre-conversion units 18a, 18b.

The pre-conversion units 18a, 18b pass frequency components in a prescribed band and convert the components to intermediate frequencies IF to output the components.

The pre-conversion units 18a, 18b may be provided by, e.g., RF spectrum analyzers. In a case that the pre-conversion units 18a, 18b are provided by RF spectrum analyzers, the RF spectrum analyzers are set at zero span mode, and a phase is locked at a reference frequency $f_{REF}$ (not shown).

(f) Data Memories 20a, 20b

The data memories 20a, 20b are disposed on the output sides of the pre-conversion units 18a, 18b. A sampling frequency $f_S$ is supplied respectively to the data memories 20a, 20b.

The data memories 20a, 20b sample the IF signals outputted by the pre-conversion units 18a, 18b, based on a sampling frequency $f_S$, and A/D convert the IF signals to store the converted signals therein. The data memories 20a, 20b store M-data. A sampling frequency $f_S$ is set to be $bw = f_S/2$.

(g) Fourier-transform Units 22a, 22b

The Fourier-transform units 22a, 22b are disposed on the output sides of the data memories 20a, 20b.

The Fourier-transform units 22a, 22b Fourier-transform data outputted by the data memories 20a, 20b to output spectra $S_A(f)$, $S_B(f)$.

(h) Switches 24a, 24b

The switches 24a, 24b are disposed on the output sides of the Fourier-transform units 22a, 22b.

The switches 24a, 24b switch the circuits for the correction and for the measurement, as do the switches 16a, 16b.

The switch 24a has the correction side (c) connected to the correction data computing unit 26 and the measurement side (m) connected to the correlation vector computing unit 30. The switch 24b has the correction side (c) connected to the correction data computing unit 26 and the measurement side (m) connected to the correlation vector computing unit 30.

When the switches 24a, 4b are set on the correction sides (c), spectra $S_A(f_C)$, $S_B(f_C)$ from the Fourier-transform units 22a, 22b are inputted to the correction data computing unit 26. When the switches 24a, 24b are set on the measurement sides (m), spectra $S_A(f)$, $S_B(f)$ from the Fourier-transform units 22a, 22b are inputted to the correlation vector computing unit 30.

(i) Correction Data Computing Unit 26

The correction data computing unit 26 uses the following formula to give correction data $Y(f_C)$ for the respective correction frequencies $f_C$, and outputs the correction data to the correction data memory 28, where * represents a complex conjugate.

Correction frequencies $f_C$ are inputted to the correction data computing unit 26 by the correction frequency control unit 10. Spectra $S_A(f_C)$, $S_B(f_C)$ are inputted to the correction data computing unit 26 from the correction sides (c) of the switches 24a, 24b.

The correction data computing unit 26 uses the following formula to give correction data $Y(f_C)$ for the respective correction frequencies $f_C$ and outputs the correction data to the correction data memory 28. * represents a complex conjugate.

$$Y(f_C) = \frac{S_A^* * (f_C) \cdot S_B(f_C)}{|S_A(f_C)|} \quad (2)$$

(j) Correction Data Memory 28

The correction data memory 28 stores the correction data $Y(f_C)$ for the respective frequencies given by the correction data computing unit 26.

That is, correction data $Y(f_C)$ are given in an $f_0 \pm bw/2$ frequency band at an $f_S/M$ step, and the correction data $Y(f_C)$ are stored in the correction data memory 28.

(k) Correlation Vector Computing Unit 30

The corrected vector computing unit 30 computes a correlation vector.

To the correlation vector computing unit 30, spectra $S_A(f)$, $S_B(f)$ outputted by the Fourier-transform units 22a, 22b are inputted through the switches 24a, 24b. The correlation vector computing unit 30 computes a correlation vector by the following formula, referring suitably to the correction data $Y(f_C)$ stored in the correction data memory 28, corresponding to a frequency (f) of a monitored signal.

$$\int_{f_0 - \frac{bw}{2}}^{f_0 + \frac{bw}{2}} \frac{S_A^*(f) \cdot S_B(f)}{|S_A(f)| \cdot Y(f)} df \quad (3)$$

A correlation vector given by the correlation vector computing unit 30 is outputted to a waveform image reproduction control unit (not shown), etc. to be presented in a display unit (not shown).

The correlation function measuring apparatus according to the present embodiment is applicable to the wave source image visualizing apparatus described in Japanese Patent Application No. 289848/1995 filed by the applicant of the present application, and others. Refer to the specification of Japanese Patent Application No. 289848/1995 about a constitution, etc. of the correlation function measuring apparatus applied to the wave source image visualizing apparatus.

(Correlation Function Measuring Method)

Next, the correlation function measuring method according to the present embodiment will be explained with reference to FIG. 1.

First, correction data $Y(f_C)$ are obtained before the measurement of a correlation function. When obtaining the correction data $Y(f_C)$, the respective switches 16a, 16b, 24a, 24b are set on the correction sides (c) so as to input to the pre-conversion units 18a, 18b correction signals outputted by the signal generator 12 and to input to the correction data computing unit 26 Fourier-transformed spectra $S_A(f_C)$, $S_B(f_C)$.

Next, the correction frequencies $f_C$ are scanned to give correction data $Y(f_C)$ for the respective correction frequencies $f_C$. Specifically, the correction frequencies $f_C$ to be supplied to the signal generator 12 by the correction frequency control unit 10 are sequentially scanned at an $f_S/M$ step in an $f_0 \pm bw/2$ frequency band to continuously producing the correction data $Y(f_C)$ for the respective correction frequencies $f_C$. The resultant correction data $Y(f_C)$ are sequentially stored in the correction data memory 28. Thus, the correction data are prepared.

When a correlation function is measured, the respective switches 16a, 16b, 24a, 24b are set on the measurement sides (m) so as to input a monitored signal (a) from the stationary antenna, and a monitored signal (b) is inputted from the scanning antenna, and input to the correlation vector computing unit 30 spectra $S_A(f)$, $S_B(f)$ outputted by the Fourier-transform units 22a, 22b.

In computing a correlation vector, the correction data $Y(f_C)$ stored in the correction data memory 28 are suitably referred to corresponding to frequencies of the monitored signals to compute the correlation vector. Thus, the correction is made for the respective frequencies, corresponding to frequency components of the monitored signals (a), (b), and the correlation vector is given with high accuracy. Refer to the specification of Japanese Patent Application No. 289848/1995 filed by the applicant of the present application for the details of the correlation vector measuring method.

When the correction data become less reliable due to changes of measuring conditions, changes of surrounding temperatures, performance changes over time, etc., correction data $Y(f_C)$ are obtained in the same way as described above to renew the correction data.

Correlation vectors are computed, referring to the new correction data $Y(f_C)$.

As described above, according to the present embodiment, correction data are obtained for respective frequencies before a correlation function is measured, the correlation function is given using the correction data corresponding to frequencies, whereby correlation vectors can be given with high accuracy. When the correction data become less reliable, the correction data are suitably renewed, whereby correction accuracy for correlation vectors can be retained. Thus, the correlation function measuring method and apparatus according to the present embodiment can measure correlation vectors with high accuracy.

(Modification (Modification 1))

Figure 2:
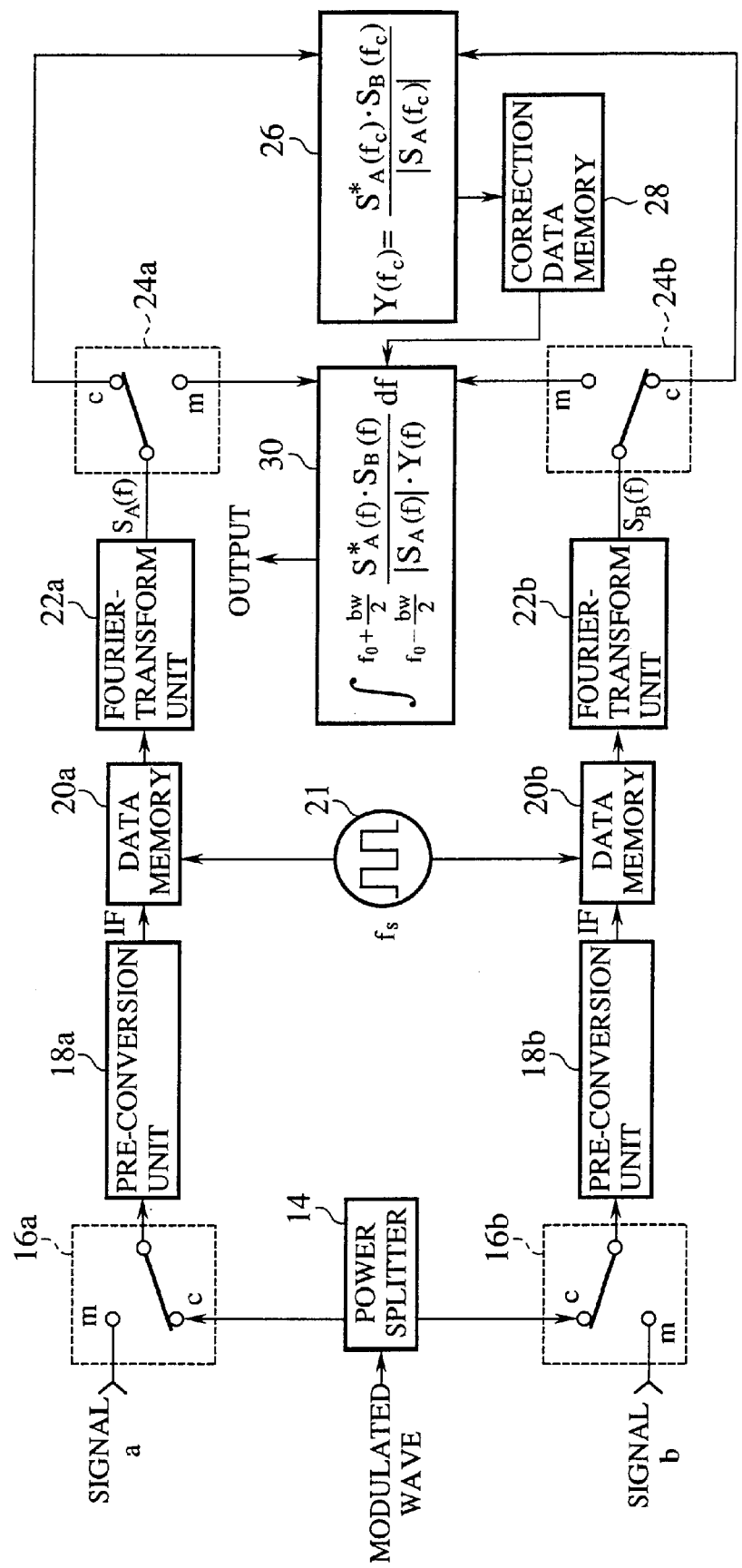
FIG. 2 is a block diagram of the correlation function measuring apparatus according to a modification (Modification 1) of the first embodiment of the present invention.
Figure 3A:
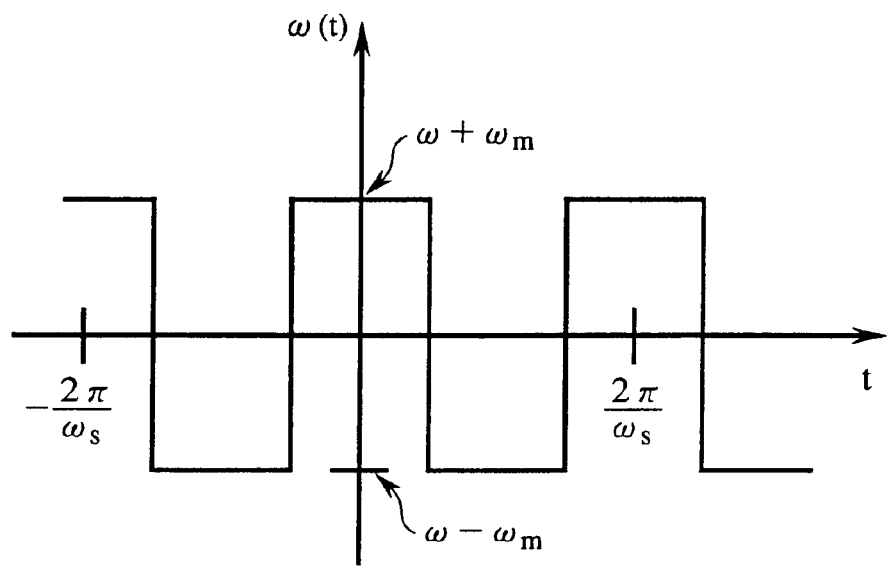
FIGS. 3A and 3B are time charts of frequency modulation and phase modulation.
Figure 3B:
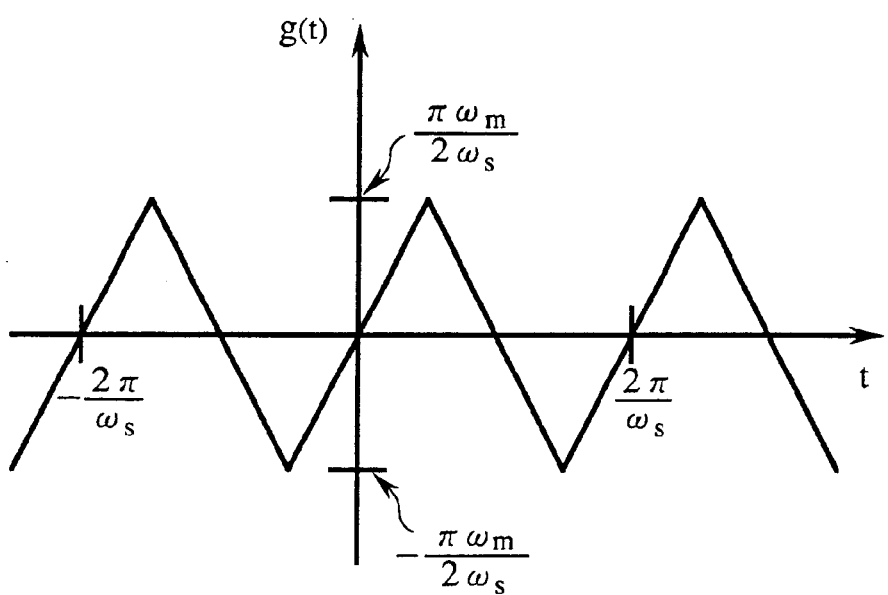

Next, a modification (Modification 1) of the correlation function measuring method and apparatus according to the present embodiment will be explained with reference to FIGS. 2 to 3B. FIG. 2 is a block diagram of the correlation function measuring apparatus according to the present modification. FIGS. 3A and 3B are time charts of frequency modulation and phase modulation.

The present modification is characterized mainly in that modulated waves are used as correction signals. The modulated waves can be FM waves or others modulated in a frequency band which, for example, is wider than a band width bw described above.

In the correlation function measuring apparatus shown in FIG. 1, frequencies of correction signals are scanned when correction data are obtained, which takes much time to obtain the correction data. In the present modification, modulated waves containing various frequency components are used as correction signals, whereby correction data can be obtained in less time. According to the present embodiment, correction data can be quickly obtained.

However, modulated waves, magnitudes of which are not uniform with respect to frequencies, must be corrected based on a theoretical magnitude distribution.

The correction using a theoretical magnitude distribution will be explained by means of an example that FM modulated waves frequency-modulated by square waves. FIG. 3A is a time chart of the frequency-modulation. FIG. 3B is a time chart of the phase modulation.

When a frequency of a carrier is modulated with a frequency $\omega_S$ to $\omega \pm \omega_m$, the following formula holds.

$$v_{mod} = A \cos\{\omega_0 t + g(t)\} \tag{4}$$

$$g(t) = \begin{cases} \omega\left\{t - \dfrac{2n\pi}{\omega_s}\right\}; & \dfrac{\pi}{\omega_s}\left(2n - \dfrac{1}{2}\right) \le t < \dfrac{\pi}{\omega_s}\left(2n + \dfrac{1}{2}\right) \\ -\omega\left\{t - \dfrac{2(n+1)\pi}{\omega_s}\right\}; & \dfrac{\pi}{\omega_s}\left(2n + \dfrac{1}{2}\right) \le t < \dfrac{\pi}{\omega_s}\left(2n + \dfrac{3}{2}\right) \end{cases} \tag{5}$$

n: an integer Then, g(t) is Fourier-expanded, and $$v_{mod} = A\cos\left\{\omega_0 t + \dfrac{4\omega_m}{\pi \omega_s} \sum_{n=1}^{\infty} \dfrac{(-1)^{n-1}}{(2n-1)^2} \sin(2n-1)\omega_s t\right\} \tag{6}$$

is given. Based on this formula, it is understood that spectra of modulated waves are present at a frequency $\omega_s$ with a frequency $\omega_0$ at the center.

Because it is difficult to compute a spectral distribution of $v_{mod}$ for the general case, the spectral distribution is computed with $\omega_0 = n\omega_S$, $\omega_m = m\omega_S$ (n>>1, n>>m), whereby $v_{mod}$ can be easily Fourier-expanded. When 1/n is neglected with respect to 1, $$v_{mod} = \begin{cases} -\dfrac{2A}{\pi}(-1)^{\frac{m+2}{2}} \sum_{l=1}^{\infty} (-1)^l \dfrac{n-2l-1}{(n-2l-1)^2 - m^2} \cos(2l+1)\omega_s t \\ \quad m+n\text{: an even number} \\ \dfrac{2A}{\pi}(-1)^{\frac{m+n+1}{2}} \sum_{l=1}^{\infty} (-1)^l \dfrac{n-2l}{(n-2l)^2 - m^2} \cos 2l\omega_s t \\ \quad m+n\text{: an odd number} \end{cases} \tag{7}$$

can be given. Accordingly, for the frequency modulation with square waves, the correction can be made with such theoretical magnitude distribution.

As described above, according to the present modification, correction data are obtained by using modulated waves, whereby the correction data can be obtained in short time.

(Modification (Modification 2))

Figure 4:
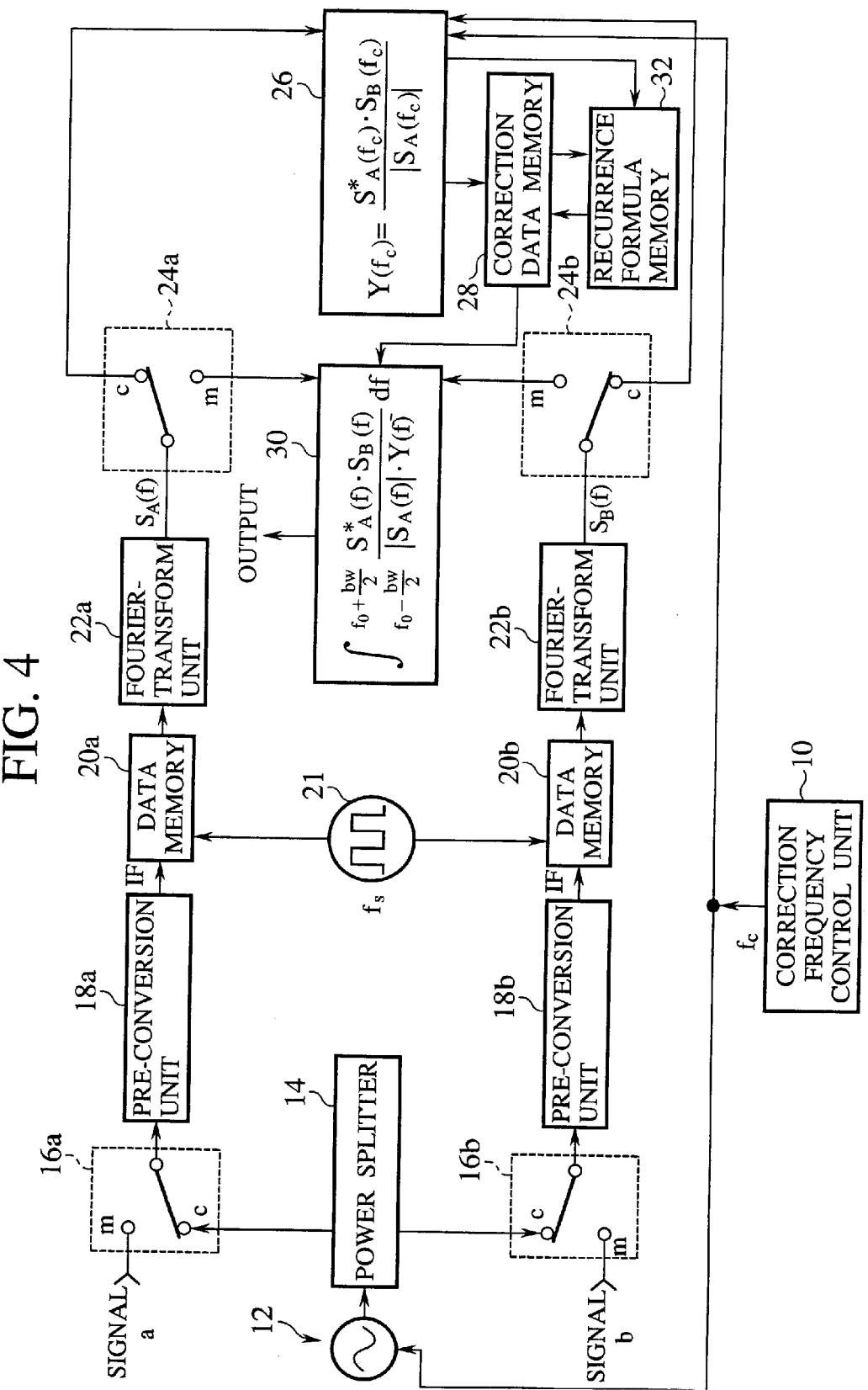
FIG. 4 is a block diagram of the correlation function measuring apparatus according to a modification (Modification 2) of the first embodiment of the present invention.

Next, a modification (Modification 2) of the correlation function measuring method and apparatus according to the present embodiment will be explained with reference to FIG. 4. FIG. 4 is a block diagram of the correlation function measuring apparatus according to the present modification.

As described above, frequency characteristics of the pre-conversion units 18a, 18b vary corresponding to surrounding temperatures and various other changes over time. However, a varied amount is mainly a vector offset.

Accordingly, even when a surrounding temperature changes, or changes over time take place, it is not essentially necessary to renew all correction data. Then, in the present modification, part of the correction data stored in the correction data memory 28 is only partially renewed for quick data renewal.

That is, as shown in FIG. 4, the correction data memory 28 is connected to a recurrence formula memory 32. Correction data given by the correction data computing unit 26 are inputted to the recurrence formula memory 32.

The recurrence formula memory 32 prepares a recurrence formula, based on correction data stored in the correction data memory 28, obtains those of the correction data necessary to determine a recurrence formula to renew the recurrence formula, and renews the correction data stored in the correction data memory 28, based on the renewed recurrence formula.

In the correlation function measuring apparatus according to the first embodiment shown in FIG. 1, all the correction data are renewed at an $f_S/M$ step, which takes long time to renew the correction data. However, in the present modification, part of the correction data are corrected, which makes the data correction quick.

Next, the correlation function measuring method according to the present modification will be explained with reference to FIG. 4.

First, in the same way as in the correlation function measuring method according to the first embodiment shown in FIG. 1, correction signals are generated by the signal generator 12 to obtain correction data. Specifically, correction frequencies $f_C$ are scanned at an $f_S/M$ step in an $f_0 \pm bw/2$ frequency band to obtain M-correction data $Y(f_C)$. The obtained correction data $Y(f_C)$ are stored by the correction data memory 28.

Next, the obtained M-correction data $Y(f_C)$ are regressed to a certain curve by the method of least squares. For example, the obtained M-correction data are regressed to a n-dimensional polynomial $$y = \sum_{m=0}^{n} a_m x^m \qquad (8)$$

The thus-given recurrence formula is stored by the recurrence formula memory 32.

Then, in the same way as in the correlation function measuring method according to the first embodiment of the present invention, electric waves are monitored.

When correction data are renewed, correction data are obtained for points which are necessary to determine a recurrence curve and renews a recurrence formula stored by the recurrence formula memory 32. For example, in a case that a recurrence curve can be determined by measuring n+1 or more inflection points, data only at the inflection points are obtained to renew the recurrence formula. Correction data derived from the renewed recurrence formula are inputted to the correction data memory 28, and the renewal of the correction data is completed.

It is possible that a standard deviation is computed when a recurrence formula is renewed, and when a standard deviation has a value above a certain value, all M-correction data are renewed.

As described above, according to the present modification, correction data may be obtained only at required points, which makes the renewal of correction data quick.

[Second Embodiment]

Figure 5:
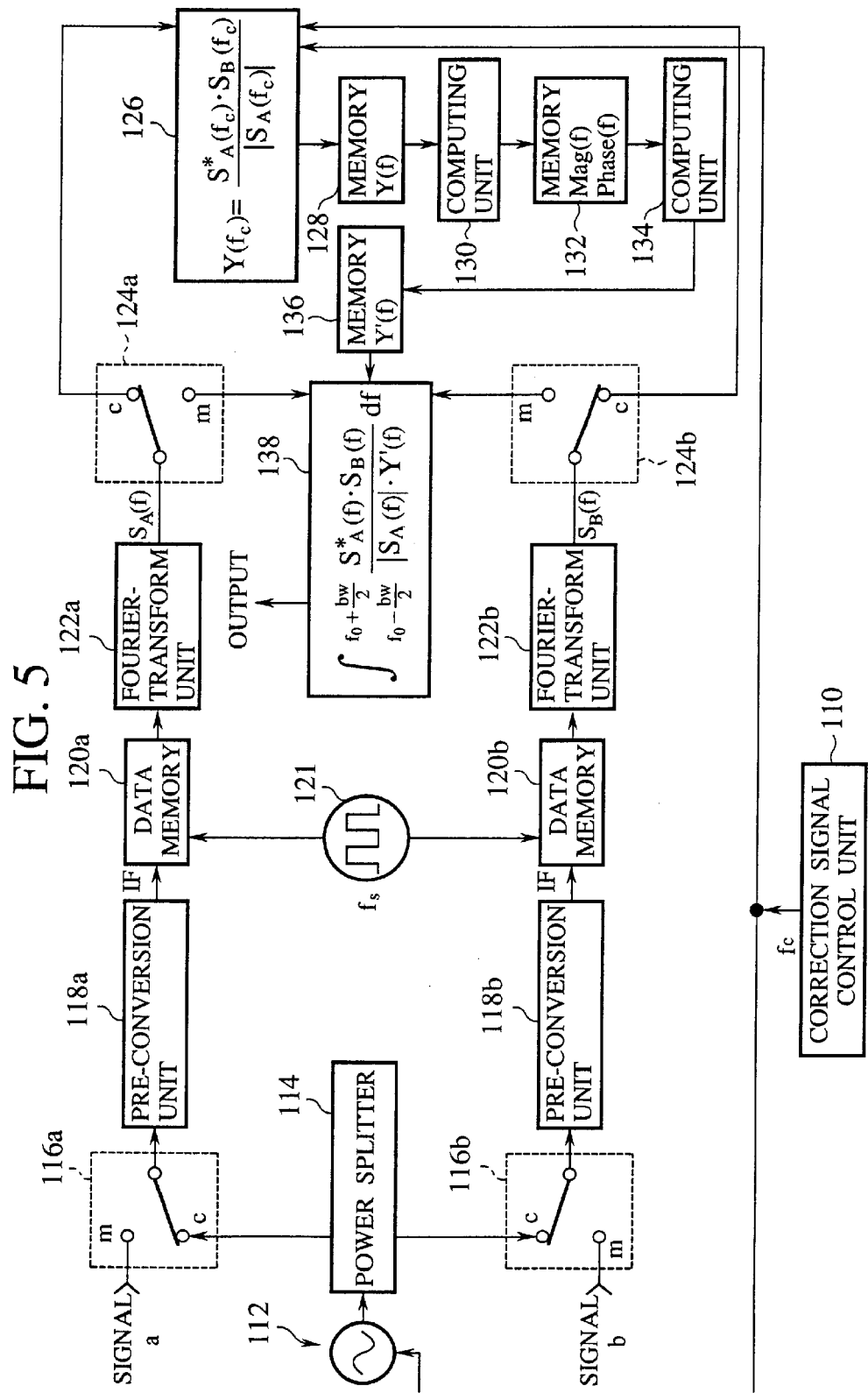
FIG. 5 is a block diagram of the correlation function measuring apparatus according to a second embodiment of the present invention.

The correlation function measuring method and apparatus according to a second embodiment of the present invention will be explained with reference to FIG. 5. FIG. 5 is a block diagram of the correlation function measuring apparatus according to the present embodiment. The same members of the present embodiment as those of the correlation function measuring method and apparatus according to the first embodiment are represented by the same reference numbers not to repeat or to simplify their explanation.

In the correlation function measuring method and apparatus according to Modification 1 of the first embodiment shown in FIG. 2, in order to quickly obtain correction data $Y(f_C)$, the correction data are obtained by using as correction signals modulated waves, such as FM waves, and correcting the correction signals by a theoretical magnitude distribution.

Because a modulated wave contains various frequency components it is not necessary to scan correction frequencies, as is in using continuous waves (CWs), and correction data $Y(f_C)$ can be obtained in short time.

However, modulated waves outputted by the signal generator are not modulated by simple functions, and it is very difficult to give a theoretical magnitude distribution. Accordingly, in using modulated waves as correction signals, the correction signals cannot be corrected by an accurate theoretical magnitude distribution, and resultantly the correction accuracy is low.

The correlation function measuring method and apparatus according to the second embodiment of the present invention is characterized mainly in that the correction can be performed quickly without lowering the correction accuracy.

(Correlation Function Measuring Apparatus)

First, the correlation function measuring apparatus according to the present embodiment will be explained.

As shown in FIG. 5, the correlation function measuring apparatus according to the present embodiment comprises a correction signal control unit 110 for controlling frequencies of correction signals; a signal generator 112 for generating the correction signals; a power splitter 114 for distributing the correction signals; switches 116a, 116b for switching the circuits for the correction and the measurement; pre-conversion units 118a, 118b for converting prescribed frequency components to a band to convert and output the frequency components to intermediate-frequencies (IF); data memory 120a, 120b for sampling and storing IF signals outputted by the pre-conversion units 118a, 118b; Fourier-transform units 122a, 122b for Fourier-transforming the data stored by the data memories 120a, 120b to give spectra $S_A(f)$, $S_B(f)$; switches 124a, 124b for switching the circuits for the correction and the measurement; a computing unit 126 for giving correction data Y(f), based on spectra corresponding to the respective correction frequencies; a memory 128 for storing the correction data Y(f) for the respective correction frequencies; a computing unit 130 for giving magnitude correction data Mag(f) and phase correction data Phase(f); a memory 132 for storing magnitude correction data Mag(f) and phase correction data Phase(f); a computing unit 134 for giving correction data Y'(f), based on the magnitude correction data Mag(f) and the phase correction data Phase(f); a memory 136 for storing the correction data Y'(f); and a correlation vector computing unit 138 for giving a correlation vector of spectra of monitored signals, referring to the correction data Y'(f).

The switch 116a has the correction side (c) connected to the power splitter 114 and the measurement side (m) connected to the stationary antenna. The switch 116b has the correction side (c) connected to the power splitter 114 and the measurement side (m) connected to the scan antenna. The switches 124a, 124b have the correction sides (c) connected to the computing unit 126 and the measurement sides (m) connected to the correlation vector computing unit 138. When the switches 116a, 116b and the switches 124a, 124b are set on the correction sides, the circuit for obtaining correction data is formed, and the circuit for measuring a correlation function is formed when the switches 116a, 116b and the witches 124a, 124b are set on the measurement sides (m).

The correlation function measuring apparatus according to the present embodiment is characterized mainly in that phase correction data Phase(f) are obtained by using modulated waves, and magnitude correction data Mag(f) are obtained by using CWs (continuous waves), and these data are used to make prescribed computations to give correction data Y'(f).

Drifts of the frequency response of the pre-conversion units 118a, 118b have relatively large deviation widths for the phase and have small deviation widths for the magnitude. Accordingly, frequent corrections are required for the phase, but for the magnitude, frequent corrections are not necessary.

On the other hand, in obtaining correction data by using modulated waves, although magnitudes cannot be accurately measured, phases can be accurately measured. In addition to this, modulated waves contain various frequency components, which permits correction data to be obtained in very short time.

Then, in the present embodiment, correction data Y'(f) are obtained by quickly obtaining phase correction data Phase (f), which require frequent corrections, by using modulated waves and accurately obtaining magnitude correction data Mag(f) by using CWs, and computing, using these data. Thus, according to the present embodiment, the correction can be quickly made as a whole without lowering correction accuracy.

In the present embodiment, correction signals of CWs are scanned at a prescribed step and interpolating the correction signals to give magnitude correction data Mag(f). Thus, according to the present embodiment, the correction can be accordingly quickly made.

Next, the respective members of the correlation function measuring apparatus according to the present embodiment will be detailed below.

(a) Correction Signal Control Unit 110

The correction signal control unit 110 suitably controls kinds and frequencies of correction signals outputted by the signal generator 112.

In order to obtain magnitude correction data Mag(f), the signal generator 112 is controlled so as to output CWs. Then, correction frequencies $f_C$ are inputted to the signal generator 112, and frequencies of correction signals to be outputted by the signal generator 112 are scanned. Specifically, correction frequencies $f_C$ are scanned at an $f_S/M$ step in an $f_0 \pm bw/2$ frequency band.

Here, $f_0$ represents a center frequency; bw, a band width; $f_S$, a sampling frequency fed by an oscillator 121 to the data memories 120a, 120b; and M, an arbitrary integer.

Correction frequencies f, are inputted not only to the signal generator 112 but also the computing unit 126.

In order to obtain phase correction data Phase(f), the signal generator 112 is controlled so as to output modulated waves. Modulated waves contain various frequency components, which makes it possible phase correction data Phase(f) to be obtained in short time.

(b) Signal Generator 112

The signal generator 112 suitably outputs CWs or modulated waves corresponding to commands of the correction signal control unit 110.

When CWs are outputted, the signal generator 112 outputs correction signals of frequencies corresponding to correction frequencies $f_C$ supplied by the correction signal control unit 110. The signal generator 112 generates correction signals of a certain magnitude independent of frequencies.

When modulated waves are outputted, the signal generator 112 outputs FM waves or others modulated in band width which is wider than, e.g., the above-described band bw.

(c) Power Splitter 114

The power splitter 114 distributes correction signals outputted by the signal generator 112 to two paths.

The output of the power splitter 114 is connected to the correction sides (c) of the switches 116a, 116b.

(d) Switches 116a, 116b

The switches 116a, 116b switch input signals for the correction and the measurement. The signals inputted to the switches 116a, 116b are of high frequencies, and are provided by switches for high frequencies.

The switch 116a has the correction side (c) connected to the power splitter 114 and the measurement side (m) connected to, e.g., stationary antenna (not shown).

When the switch 116a is set on the correction side (c), correction signals are inputted to the pre-conversion unit 118a from the signal generator 112 through the switch 116a. When the switch 116a is set on the measurement side (m), monitored signals (a) are inputted to the pre-conversion unit 118a from the stationary antenna through the switch 116a.

On the other hand, the switch 116b has the correction side (c) connected to the power splitter 114 and the measurement side (m) connected to, e.g., a scan antenna (not shown). When the switch 116b is set on the correction side (c), correction signals from the signal generator 112 are inputted to the pre-conversion unit 118b through the switch 116b. When the switch 116b is set on the measurement side (m), monitored signals (b) from the scan antenna are inputted to the pre-conversion unit 118b through the switch 116b.

That is, the switches 116a, 116b are set on the correction sides (c), the circuit for obtaining correction data is formed, and the circuit for measuring a correlation function is formed when the switches 116a, 116b are set on the measurement sides (m).

(e) Pre-conversion Units 118a, 118b

The pre-conversion units 118a, 118b are disposed respectively on the output sides of the switches 116a, 116b.

The pre-conversion units 118a, 118b pass only components of a prescribed frequency band and convert the components to intermediate frequencies IF, and outputs the same.

The pre-conversion units 118a, 118b can be provided by, e.g., RF spectral analyzers. In a case that the pre-conversion units 118a, 118b are provided by RF spectral analyzers, a zero-span mode is set to lock a phase at a reference frequency $f_{REF}$ (not shown).

Drifts of frequency response take place in the pre-conversion units 118a, 118b. The drifts have small magnitude deviation widths and relatively large phase deviation widths. This will be because when thermal external causes affect the circuit in high frequencies, the phase, i.e., the delay time is much affected.

(f) Data Memories 120a, 120b

The data memories 120a, 120b are disposed on the output sides of the pre-conversions units 118a, 118b. Sampling frequencies $f_S$ are supplied respectively to the data memories 120a, 120b.

The data memories 120a, 120b sample IF signals outputted by the pre-conversion units 118a, 118b, based on the sampling frequencies $f_S$ and A/D convert, and store the converted signals. The data memories 120a, 120b store M-data. The sampling frequencies $f_S$ are set to be $bw=f_S/2$.

(g) Fourier-transform Units 122a, 122b

The Fourier-transform units 122a, 122b are disposed on the output sides of the data memories 120a, 120b.

The Fourier-transform units 122a, 122b Fourier-transform data outputted by the data memories 120a, 120b to output spectra $S_A(f)$, $S_B(f)$.

(h) Switches 124a, 124b

The switches 124a, 124b are disposed on the output sides of the Fourier-transform units 122a, 122b.

The switches 124a, 124b switch the circuits for the correction and the measurement, as do the switches 116a, 116b.

The switch 124a has the correction side (c) connected to the computing unit 126 and the measurement side (m) connected to the correlation vector computing unit 138. The switch 124b has the correction side (c) connected to the computing unit 126 and the measurement side (m) connected to the correlation vector computing unit 138.

When the switches 124a, 124b are set on the correction sides (c), spectra $S_A(f_C)$, $S_B(f_C)$ outputted by the Fourier-transform units 122a, 122b are inputted to the computing unit 126. When the switches 124a, 124b are set on the measurement sides (m), spectra $S_A(f)$, $S_B(f)$ outputted by the Fourier-transform units 122a, 122b are inputted to the correlation vector computing unit 138.

(i) Computing Unit 126

The computing unit 126 computes correction data $Y(f_C)$ for respective frequencies.

To the computing unit 126, correction frequencies $f_C$ are inputted by the correction signal control unit 110. Spectra $S_A(f_C)$, $S_B(f_C)$ are inputted to the computing unit 126 from the correction sides (c) of the switches 124a, 124b.

The computing unit 126 gives correction data $Y(f_C)$ for respective correction frequencies $f_C$ and output the same to the correction data memory 128, where * represents a complex conjugate.

$$Y(f_C) = \frac{S_A^*(f_C) \cdot S_B(f_C)}{|S_A(f_C)|} \quad (9)$$

(j) Memory 128

The memory 128 is disposed on the output side of the computing unit 126.

The memory 128 stores correction data $Y(f)$ for respective frequencies given by the computing unit 126.

In order to give magnitude correction data, correction data $Y(f)$ are given at an $f_S/M$ step in an $f_0 \pm bw/2$ frequency band, and the correction data $Y(f)$ are stored by the memory 128.

In order to obtain phase correction data, correction data $Y(f)$ for respective frequencies are also stored by the memory 128.

(k) Computing Unit 130

The computing unit 130 is disposed on the output side of the memory 128.

The computing unit 130 computes magnitude correction data Mag(f) and phase correction data Phase(f).

In order to give magnitude correction data Mag(f), data S(f) are given by the following formula while correction signals $f_S$ of CWs are being scanned at an $f_S/M$ step. It is not essential to scan correction signals at an $f_S/M$ step, and correction signals may be scanned at a step smaller than an $f_S/M$ step.

$$S(f)=|Y(f)| \quad (10)$$

Then, data S(f) are interpolated to give magnitude correction data Mag(f). For the interpolation, spline interpolation, for example, can be used.

Magnitude correction data Mag(f) are given by the interpolation, whereby although CWs are used, magnitude correction data Mag(f) can be quickly given.

In order to give phase correction data Phase(f), the phase correction data Phase(f) are given by the following formula.

$$\text{Phase}(f) = \arctan\left[\frac{Im\{y(f)\}}{Re\{Y(f)\}}\right] \quad (11)$$

(l) Memory 132

The memory 132 is disposed on the output side of the computing unit 130.

The memory 132 respectively stores magnitude correction data Mag(f) and phase correction data Phase(f) given by the computing unit 130.

(m) Computing Unit 134

The computing unit 134 is disposed on the output side of the memory 132.

The computing unit 134 computes correction data Y'(f), using magnitude correction data Mag(f) and phase correction data Phase(f).

Correction data Y'(f) are given by the following formula.

$$Y'(f)=\text{Mag}(f)\times[\cos\{\text{Phase}(f)\}+i\cdot\sin\{\text{Phase}(f)\}] \quad (12)$$

(n) Memory 136

The memory 136 is disposed on the output side of the computing unit 134.

The memory 136 stores correction data Y'(f) given by the computing unit 134.

(o) Correlation Vector Computing Unit 138

The correlation vector computing unit 138 computes a correlation vector.

Spectra $S_A(f)$, $S_B(f)$ outputted by the Fourier-transform units 122a, 122b are inputted through the switches 124a, 124b to the correlation vector computing unit 138.

The correlation vector computing unit 138 computes a correlation vector by the following formula, suitably referring correction data Y'(f) stored in the correction data memory 136 corresponding to frequencies of monitored signals.

$$\int_{f_0-\frac{bw}{2}}^{f_0+\frac{bw}{2}} \frac{S_A^*(f) \cdot S_B(f)}{|S_A(f)| \cdot Y'(f)} df \quad (13)$$

A correlation vector given by the correlation vector computing unit 138 is outputted to the wave image reproduction control unit (not shown), etc. to be presented on a display unit (not shown).

The correlation function measuring apparatus according to the present embodiment is applicable to the wave source image visualizing apparatus described in Japanese Patent Application No. 289848/1995 filed by the applicant of the present application, and others. Refer to the specification of Japanese Patent Application No. 289848/1995 about a constitution, etc. of the correlation function measuring apparatus applied to the wave source image visualizing apparatus.

(Accuracy of Data)

Next, accuracy of magnitude correction data Mag(f) given in the present embodiment will be explained with reference to FIG. 6.

FIG. 6 is graphs of phase correction data and magnitude correction data given by using CWs. These data were measured in the range of 7.5 to 12.5 MHz.

Figure 6A:
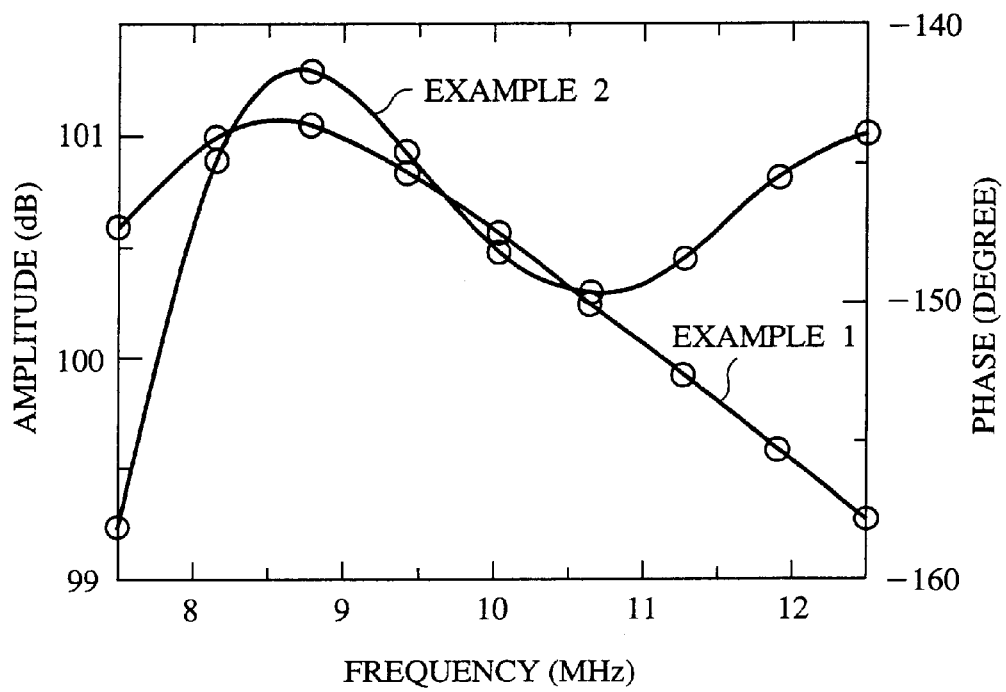
FIGS. 6A and 6B are graphs of phase correction data and magnitude correction data given by using continuous waves.

In FIG. 6A, Example 1 indicates phase correction data given by spline interpolation, and Example 2 indicates magnitude correction data given by spline interpolation. The measuring points were 9, and a required time for the measurement was about 5 seconds. In FIG. 6A, the circles indicate the measuring points.

Figure 6B:
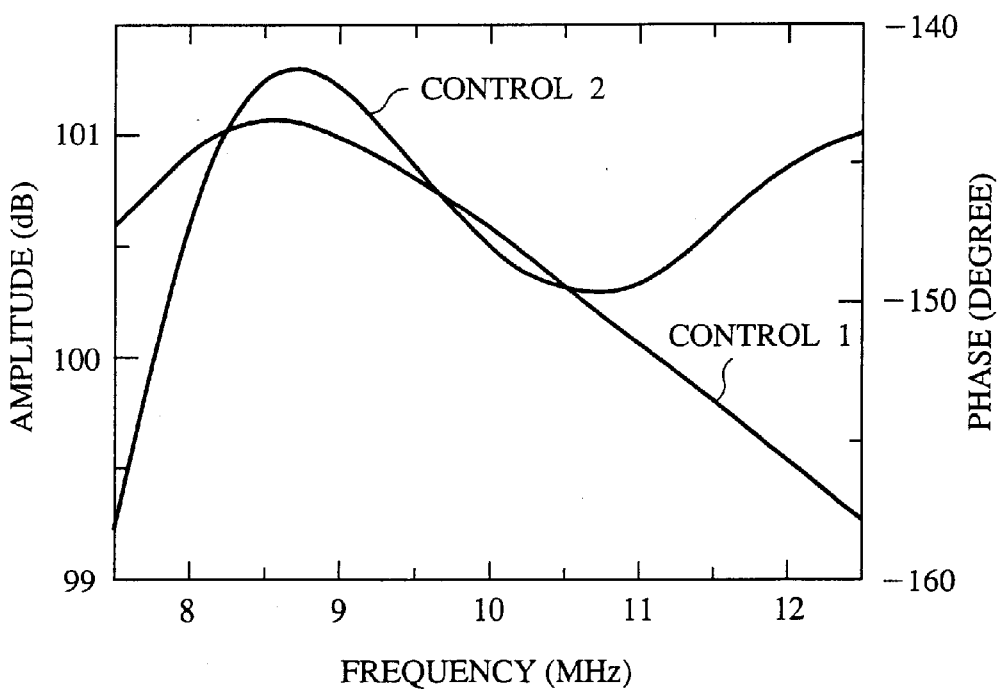

In FIG. 6B, Control 1 indicates phase correction data given without the interpolation. Control 2 indicates magnitude correction data given without the interpolation. The measuring points were 129, and a required time for the measurement was about 1 minute.

As seen in comparison of Example 2 with Control 2, an amplitude difference between the two is suppressed to be below about 0.1 dB. As seen from this, even when the spline interpolation is used, the amplitude correction data Mag(f) can be given with high accuracy.

Next, accuracy of the phase correction data Phase(f) given in the present embodiment will be explained with reference to FIGS. 7A and 7B.

Figure 7A:
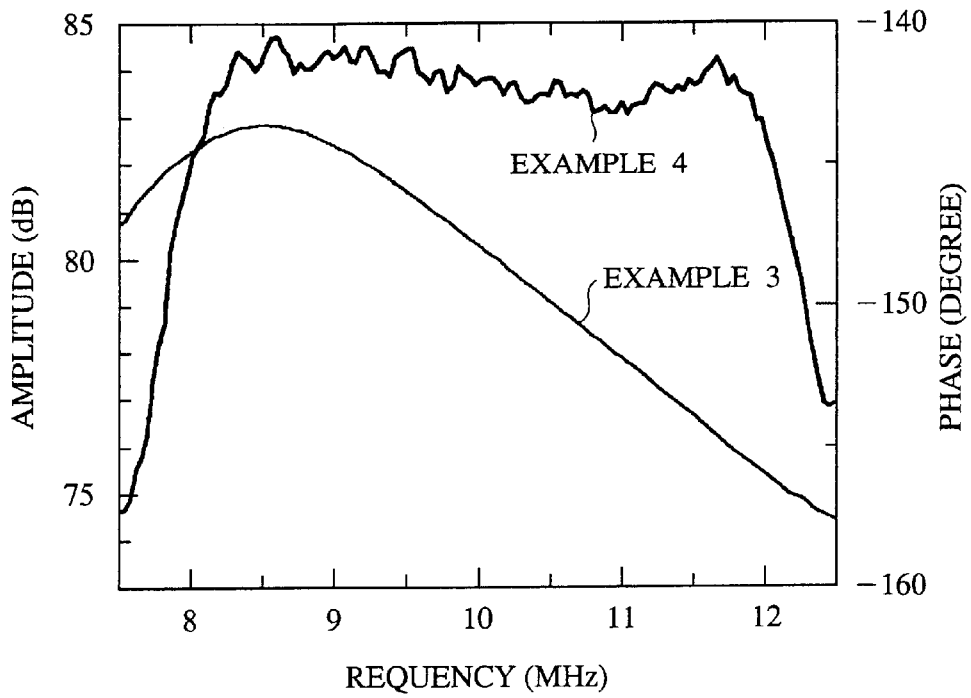
FIGS. 7A and 7B are graphs of phase correction data and magnitude correction data given by using modulated signal.

FIG. 7A is a graph of phase correction data and magnitude correction data given by using modulated waves. In FIG. 7A, Example 3 indicates phase correction data given by using modulated waves, and Example 4 indicates magnitude correction data given by modulated waves.

Figure 7B:
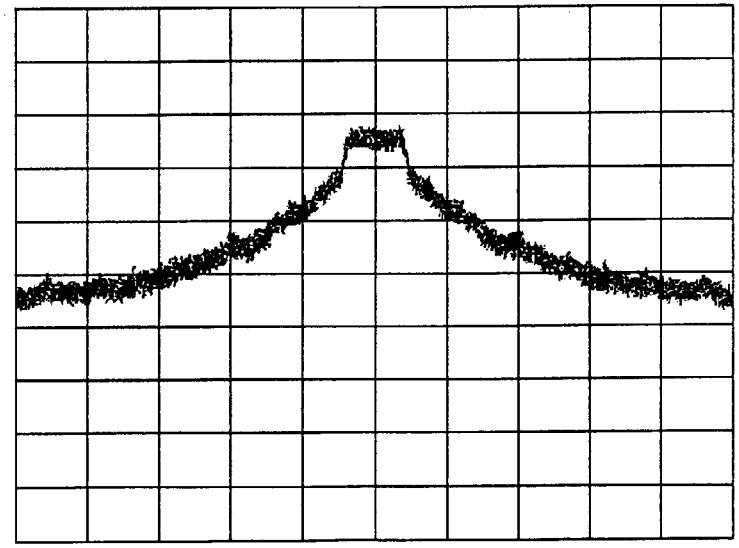

FIG. 7B is spectra of modulated waves used in obtaining data shown in FIG. 7A. A center frequency is 2GHz, and a span is 50 MHz. The data shown in FIG. 7A were given by using as correction signals 2 GHz±2.5 MHz modulated waves shown in FIG. 7B.

As seen in comparison of Example 3 shown in FIG. 7A with Control 1 shown in FIG. 6B, a phase difference between the two is suppressed to be below 0.2 degrees. Based on this, phase correction data Phase(f) can be given with high accuracy.

(Correlation Function Measuring Method)

Next, the correlation function measuring method according to the present embodiment will be explained with reference to FIG. 5.

First, correction data Y'(f) are obtained before the measurement of a correlation function. When obtaining the correction data Y'(f), the respective switches 116a, 116b, 124a, 124b are set on the correction sides (c) so as to input to the pre-conversion units 118a, 118b correction signals outputted by the signal generator 112 and input to the computing unit 126 Fourier-transformed spectra $S_A(f_C)$, $S_B(f_C)$.

Next, in order to obtain magnitude correction data Mag(f), the signal generator 112 is controlled to output CWs.

Next, correction frequencies $f_C$ are scanned to give correction data $Y(f_C)$ for the respective correction frequencies $f_C$. Specifically, the correction frequencies $f_C$ to be supplied to the signal generator 112 by the correction frequency control unit 110 are sequentially scanned at an $f_S/M$ step in an $f_0 \pm bw/2$ frequency band to continuously produce, in the computing unit 126, the correction data $Y(f_C)$ for the respective correction frequencies $f_C$. The resultant correction data $Y(f_C)$ are sequentially stored in the correction data memory 128.

Further, the above-described computation is made in the computing unit 130 to thereby give magnitude correction data Mag(f). The thus-given magnitude correction data Mag(f) are stored in the memory 132. In a case, for example, that a band width bw is 10 MHz and measuring points are 9, magnitude correction data Mag(f) can be given in about 6 seconds.

Then, in order to give phase correction data Phase(f), the signal generator 112 is controlled to output modulated waves.

In the computing unit 126, correction data $Y(f_C)$ for respective correction frequencies $f_C$. In a case, for example that a band width bw is 10MHz, phase correction data Phase(f) can be obtained in about 0.5 seconds.

Further, the above-described computation is made in the computing unit 130 to thereby give phase correction data Phase(f). The thus-given phase correction data Phase(f) are stored in the memory 132.

Next, in the computing unit 134, the above-described computation is made, using magnitude correction data Mag(f) and phase correction data Phase(f) to thereby give correction data Y'(f). The thus-given correction data Y'(f) are stored in the memory 136.

Thus, the operation for obtaining correction data Y'(f) is completed.

When a correlation function is measured, the respective switches 116a, 116b, 124a, 124b are set on the measurement sides (m) so as to input a monitored signal (a) from the stationary antenna, and a monitored signal (b) is inputted from the scanning antenna, and input to the correlation vector computing unit 138 spectra $S_A(f)$, $S_B(f)$ outputted by the Fourier-transform units 122a, 122b.

In computing a correlation vector, the correction data Y'(f) stored in the correction data memory 136 are suitably referred to corresponding to frequencies of the monitored signals to compute the correlation vector. Thus, the correction is made for the respective frequencies, corresponding to frequency components of the monitored signals (a), (b), and the correlation vector is given with high accuracy. Refer to the specification of Japanese Patent Application No. 289848/1995 filed by the applicant of the present application for the details of the correlation vector measuring method.

When the correction data Y'(f) become less reliable due to changes of measuring conditions, changes of surrounding temperatures, various performance changes over time, etc., only phase correction data Phase(f) are obtained in the same way as described above and made the required computation to renew the correction data Y'(f).

Then, referring to the new correction data Y'(f), a correlation vector is computed.

When reliability of magnitude correction data Mag(f) is judged to have lowered, not only phase correction data Phase(f) but also magnitude correction data Mag(f) are obtained again, and correction data Y'(f) are given by making the computation using these data. For example, phase correction data Phase(f) are stored when magnitude correction data Mag(f) are obtained, and when, with respect to the stored phase correction data Phase(f), values of phase correction data Phase(f) have changed by more than a prescribed value, it is likely that the reliability of the magnitude correction data Mag(f) has lowered, and the stored magnitude correction data Mag(f) may be renewed. It can be given by, e.g., a standard deviation value or others that values of phase correction data Phase(f) have changed by more than a prescribed value.

As described above, according to the present embodiment, phase correction data Phase(f), which must be frequently obtained, are given by using modulated waves, and magnitude correction data Mag(f), which need not be frequently obtained, are given by using CWs. Correction data Y'(f) corresponding to respective frequencies can be obtained by using these data, whereby the correction can be quickly made without lowering correction accuracy.

Furthermore, in the present embodiment, correction signals of CWs are scanned at a prescribed step and interpolated to thereby give magnitude correction data Mag(f), which makes the correction quicker.

[Modifications]

The present invention is not limited to the above-described embodiments.

For example, the first and the second embodiments are explained by examples that in monitoring electric waves, a correlation function of monitored signals inputted from the stationary antenna and the scan antenna is measured, but the present invention is widely applicable not only to the monitor of electric waves, but also to correlation functions of a plurality of monitored signals.

The first and the second embodiments are applied to the computation of a correlation vector of two monitored signals but is applicable to the computation of three or more correlation vectors.

In the second embodiment, phase correction data are given by using modulated waves, but phase correction data may not be given by using modulated waves. For example, continuous waves may be used to give phase correction data when the quick correction is not required.

As described above, according to the present invention, before the measurement of a correlation function, correction data are given for respective frequencies to give the correlation vector by using the correction data corresponding to the frequencies, whereby the correlation vector can be given with high accuracy. When correction data become less reliable, correction data are suitably renewed, whereby function vectors can have high accuracy. Thus, the present invention can provide a high correlation function measuring method and apparatus which can measure correlation function with high accuracy.

According to the present invention, phase correction data Phase(f), which are frequently necessary are obtained by using modulated waves, while magnitude correction data Mag(f), which are not frequently necessary are obtained by using CWs, and correction data Y'(f) corresponding to respective frequencies are given by using these data, whereby the correction can be quickly made without lowering correction accuracy.

According to the present invention, correction signals of CWs are scanned at a prescribed step, and magnitude correction data Mag(f) are given by interpolation, whereby the correction can be quicker.

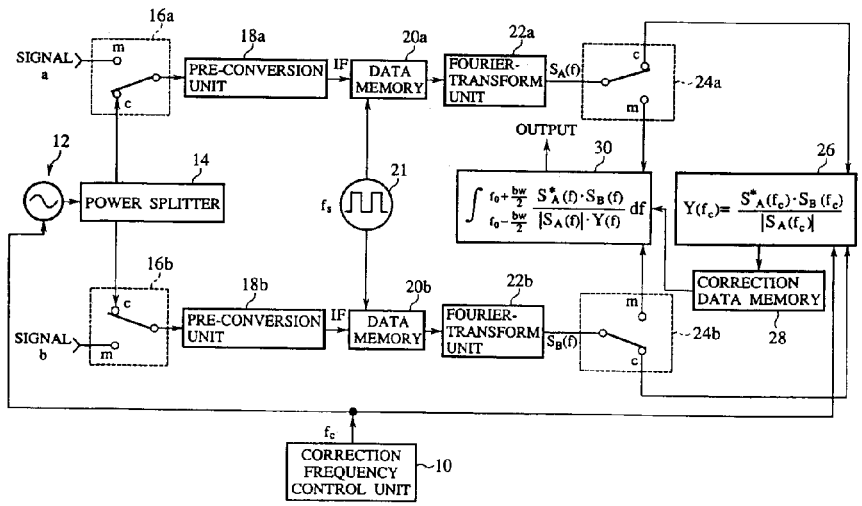

What is claimed is:

1. A correlation function measuring method in which a first monitored signal is processed by a first signal processing means to give a first spectrum, a second monitored signal is processed by a second signal processing means to give a second spectrum, and a correlation function between the first spectrum and the second spectrum is measured, the method comprising the steps of:

inputting, before measuring the correlation function, correction signals to the first signal processing means and the second signal processing means, and obtaining correction values corresponding to frequencies of the correction signals, based on spectrums from the first and second signal processing means; and in measuring the correlation function, producing a correlation function between the first spectrum and the second spectrum by using the correction values corresponding to the frequencies;

wherein when obtaining the correction values, first correction signals are supplied to the first and second signal processing means and their frequencies swept to produce magnitude correction data corresponding to the frequencies based on spectrums from the first and second signal processing means, and second correction signals are supplied to the first and second signal processing means to produce phase correction data corresponding to the respective frequencies based on spectrums from the first and second signal processing means, and the correction values corresponding to the respective frequencies are obtained based on the magnitude correction data and the phase correction data;

wherein the first correction signals are continuous waves while the second correction signals are modulated waves.

2. A correlation function measuring method according to claim 1, wherein in giving the magnitude correction data, the frequencies of the first correction signals are scanned at a prescribed step and interpolated to give the magnitude correction data.

3. A correlation function measuring method according to claim 1, wherein the phase correction data are renewed more frequently than the magnitude correction data.

4. A correlation function measuring method according to claim 3, wherein when the renewed phase correction data are changed by an amount above a prescribed value with respect to the phase correction data at the time of obtaining the magnitude correction data, the magnitude correction data are renewed.

5. A correlation function measuring apparatus, comprising:

first signal processing means for processing a first monitored signal to give a first spectrum;

second signal processing means for processing a second monitored signal to give a second spectrum;

correction value computing means for inputting correction signals to the first signal processing means and the second signal processing means to obtain correction values corresponding to frequencies based on the spectrums from the first and second signal processing means; and correlation function computing means for producing a correlation function between the first spectrum and the second spectrum by using the correction values established by the correction value computing means;

wherein when obtaining the correction values, first correction signals are supplied to the first and second signal processing means and their frequencies swept to produce magnitude correction data corresponding to the frequencies based on spectrums from the first and second signal processing means, and second correction signals are supplied to the first and second signal processing means to produce phase correction data corresponding to the respective frequencies based on spectrums from the first and second signal processing means, and the correction values corresponding to the respective frequencies are obtained based on the magnitude correction data and the phase correction data; and wherein the first correction signals are continuous waves while the second correction signals are modulated waves.

6. A correlation function measuring apparatus according or claim 5, wherein the correction value computing means scans the frequencies of the first correction signal at a prescribed step and interpolates to give the magnitude correction data.

7. A correlation function measuring apparatus according to claim 5, wherein
the correction value computing means renews the phase correction data more frequently than the magnitude correction data.

8. A correlation function measuring apparatus according to claim 7, wherein
the correction value computing means renews the magnitude correction data when the renewed phase correction data has changed by an amount above a prescribed value with respect to the phase correction data given at the time for obtaining the magnitude correction data.

9. A correlation function measuring method in which a first monitored signal is processed by a first signal processing means to give a first spectrum, a second monitored signal is processed by a second signal processing means to give a second spectrum, and a correlation function between the first spectrum and the second spectrum is measured, the method comprising the steps of:

inputting, before measuring the correlation function, correction signals to the first signal processing means and the second signal processing means, and obtaining correction values corresponding to frequencies of the correction signals, based on spectrums from the first and second signal processing means;

in measuring the correlation function, producing a correlation function between the first spectrum and the second spectrum by using the correction values corresponding to the frequencies;

creating a recurrence formula based on the correction values; and renewing the correction values where correction values necessary to determine at least the recurrence formula are again obtained to renew the recurrence formula, and the correction values are renewed based on the renewed recurrence formula;

wherein when obtaining the correction values, first correction signals are supplied to the first and second signal processing means and their frequencies swept to produce magnitude correction data corresponding to the frequencies based on spectrums from the first and second signal processing means, and second correction signals are supplied to the first and second signal processing means to produce phase correction data corresponding to the respective frequencies based on spectrums from the first and second signal processing means, and the correction values corresponding to the respective frequencies are obtained based on the magnitude correction data and the phase correction data; and wherein the first correction signals are continuous waves while the second correction signals are modulated waves.

10. A correlation function measuring apparatus, comprising:

first signal processing means for processing a first monitored signal to give a first spectrum;

second signal processing means for processing a second monitored signal to give a second spectrum;

correction value computing means for inputting correction signals to the first signal processing means and the second signal processing means to obtain correction values corresponding to frequencies based on the spectrums from the first and second signal processing means; and correlation function computing means for producing a correlation function between the first spectrum and the second spectrum by using the correction values established by the correction value computing means;

wherein the correction value computing means produces a recurrence formula based on the correction values, where correction values necessary to determine at least the recurrence formula are again produced to renew the recurrence formula, thereby renewing the correction values based on the renewed recurrence formula;

wherein when obtaining the correction values, first correction signals are supplied to the first and second signal processing means and their frequencies swept to produce magnitude correction data corresponding to the frequencies based on spectrums from the first and second signal processing means, and second correction signals are supplied to the first and second signal processing means to produce phase correction data corresponding to the respective frequencies based on spectrums from the first and second signal processing means, and the correction values corresponding to the respective frequencies are obtained based on the magnitude correction data and the phase correction data; and wherein the first correction signals are continuous waves while the second correction signals are modulated waves.

* * * * *

UNITED STATES PATENT AND TRADEMARK OFFICE
CERTIFICATE OF CORRECTION

PATENT NO.    : 6,594,605
DATED         : July 15, 2003
INVENTOR(S)   : Kurosawa It is certified that error appears in the above-identified patent and that said Letters Patent is hereby corrected as shown below:

Delete Title page illustrating figure, and substitute therefor new Title page illustrating figure. (attached)

Delete drawings sheets 1 & 5, and substitute therefor drawings sheets 1 & 5, as shown on the attached sheet.

Signed and Sealed this

Twenty-eighth Day of September, 2004

JON W. DUDAS
*Director of the United States Patent and Trademark Office*

(12) United States Patent
Kurosawa

(10) Patent No.: US 6,594,605 B2
(45) Date of Patent: Jul. 15, 2003

(54) CORRELATION FUNCTION MEASURING METHOD AND APPARATUS

(75) Inventor: Makoto Kurosawa, Tokyo (JP)

(73) Assignees: Advantest Corp., Tokyo (JP); Minister of Public Management Home Affairs, Posts and Telecommunications, Tokyo (JP)

(*) Notice: Subject to any disclaimer, the term of this patent is extended or adjusted under 35 U.S.C. 154(b) by 31 days.

(21) Appl. No.: 09/771,527

(22) Filed: Jan. 29, 2001

(65) Prior Publication Data
US 2001/0020220 A1 Sep. 6, 2001

(30) Foreign Application Priority Data

| Feb. 3, 2000 | (JP) | 2000-026863 |
| Apr. 27, 2000 | (JP) | 2000-127080 |
| Sep. 28, 2000 | (JP) | 2000-296812 |

(51) Int. Cl.[7] ............................ G01R 23/16; G03H 5/00
(52) U.S. Cl. ..................... 702/106; 702/74; 356/450; 375/142
(58) Field of Search ........................ 702/74, 75, 76, 702/106, 69–71; 375/142, 150, 343; 382/278; 356/450, 457; 455/276.1, 295

(56) References Cited

U.S. PATENT DOCUMENTS

| 4,169,245 A | * | 9/1979 | Crom et al. ............... 455/132 |
| 4,607,215 A | * | 8/1986 | Takano et al. ............ 324/76.23 |
| 4,947,176 A | * | 8/1990 | Inatsune et al. ............ 342/173 |
| 5,146,471 A | * | 9/1992 | Cowart ...................... 375/142 |
| 5,748,314 A | * | 5/1998 | Kitayoshi .................. 356/450 |
| 6,272,189 B1 | * | 8/2001 | Garin et al. ............... 375/343 |
| 6,295,442 B1 | * | 9/2001 | Camp, Jr. et al. ......... 455/102 |
| 2001/0002203 A1 | * | 5/2001 | Cahn et al. ................ 375/142 |

FOREIGN PATENT DOCUMENTS

| DE | 196 45 953 A1 | 5/1997 |
| JP | 9-134113 A | 5/1997 |

* cited by examiner

Primary Examiner—Marc S. Hoff
Assistant Examiner—Jeffrey West
(74) Attorney, Agent, or Firm—Muramatsu & Associates

(57) ABSTRACT

A correlation function measuring method and apparatus can correct a correlation vector with high accuracy. The correlation function measuring apparatus includes first signal processing means $18a$ to $22a$ for processing a first monitored signal to give a first spectrum, second signal processing means $18b$ to $22b$ for processing a second monitored signal to give a second spectrum, correction value computing means 26 for inputting correction signals to the first and second signal processing means to give correction values corresponding to respective frequencies, based on the first spectrum and the second spectrum, and correlation function computing means 30 for obtaining a correlation function between the first spectrum and the second spectrum by using correction values given by the correction value computing means.

10 Claims, 8 Drawing Sheets